US010650454B2

United States Patent
Farnstrom et al.

(10) Patent No.: US 10,650,454 B2
(45) Date of Patent: May 12, 2020

(54) LARGE LIQUIDITY SEEKING TRADING PLATFORM

(71) Applicant: NYSE Group, Inc., New York, NY (US)

(72) Inventors: Amy Joy Farnstrom, Oakland, CA (US); Steven G. Crutchfield, New York, NY (US); James Hyde, Holmdel, NJ (US)

(73) Assignee: NYSE Group, Inc., New York, NY (US)

( * ) Notice: Subject to any disclaimer, the term of this patent is extended or adjusted under 35 U.S.C. 154(b) by 435 days.

(21) Appl. No.: 14/857,256

(22) Filed: Sep. 17, 2015

(65) Prior Publication Data

US 2016/0005122 A1     Jan. 7, 2016

Related U.S. Application Data

(62) Division of application No. 14/574,930, filed on Dec. 18, 2014.

(Continued)

(51) Int. Cl.
*G06Q 40/04*     (2012.01)

(52) U.S. Cl.
CPC ................... *G06Q 40/04* (2013.01)

(58) Field of Classification Search
CPC ....................................................... G06Q 40/04
See application file for complete search history.

(56) References Cited

U.S. PATENT DOCUMENTS

| 7,552,083 | B2 * | 6/2009 | Carone .................. G06Q 30/08 705/35 |
| 7,565,313 | B2 * | 7/2009 | Waelbroeck ....... G06Q 30/0251 700/99 |

(Continued)

FOREIGN PATENT DOCUMENTS

WO     2013/010149 A1     1/2013

OTHER PUBLICATIONS

Methodlogy Index Construction Objections, Guiding Principles and Methodology for the MSCI global Investable Market Indicies (Year: 2012).*

(Continued)

*Primary Examiner* — Bruce I Ebersman
(74) *Attorney, Agent, or Firm* — DLA Piper LLP (US)

(57) ABSTRACT

An electronic trading system implements a display price that guarantees a minimum available quantity for trade. The electronic trading system determines a quantity of financial instruments available at various prices for incoming orders. A display bid price and display offer price are determined so that the quantity available at the display prices exceeds a display quantity threshold. The electronic trading system receives orders designated fast and slow. Fast orders are used for large, rapid trades at known prices. Slow orders trade with a delay for a price improvement auction. Orders meeting a minimum order quantity threshold may participate in an auction for incoming orders that offers price improvement to the execution price of aggressively priced orders. The electronic trading system implements risk management measures based on order size and percentage filled for individual trades and series of trades. The electronic trading system supports orders having multiple legs.

12 Claims, 7 Drawing Sheets

Related U.S. Application Data

(60) Provisional application No. 61/922,731, filed on Dec. 31, 2013.

(56) References Cited

U.S. PATENT DOCUMENTS

| | | | | |
|---|---|---|---|---|
| 8,612,323 | B1* | 12/2013 | Frait | G06Q 40/04 705/14.34 |
| 8,843,592 | B2* | 9/2014 | Jensen | G06Q 40/06 705/14.11 |
| 2001/0044767 | A1 | 11/2001 | Madoff et al. | |
| 2003/0126066 | A1* | 7/2003 | Nunes | G06Q 30/0627 705/37 |
| 2004/0034591 | A1* | 2/2004 | Waelbroeck | G06Q 30/0251 705/37 |
| 2004/0143538 | A1 | 7/2004 | Korhammer et al. | |
| 2004/0172337 | A1 | 9/2004 | Spoonhower et al. | |
| 2006/0069535 | A1 | 3/2006 | Mnatsakanyan | |
| 2006/0106713 | A1 | 5/2006 | Tilly et al. | |
| 2006/0149659 | A1 | 7/2006 | Carone et al. | |
| 2006/0253379 | A1 | 11/2006 | Adcock et al. | |
| 2006/0253380 | A1 | 11/2006 | Adcock et al. | |
| 2007/0078753 | A1* | 4/2007 | Cormack | G06Q 30/08 705/37 |
| 2007/0118460 | A1 | 5/2007 | Bauerschmidt et al. | |
| 2008/0228623 | A1 | 9/2008 | Adcock et al. | |
| 2009/0112775 | A1 | 4/2009 | Chiulli et al. | |
| 2011/0153521 | A1 | 6/2011 | Green et al. | |
| 2011/0246351 | A1* | 10/2011 | Sulavka | G06Q 40/04 705/37 |
| 2014/0136395 | A1 | 5/2014 | Dowling | |
| 2015/0026033 | A1 | 1/2015 | Curran et al. | |
| 2015/0127520 | A1 | 5/2015 | Farnstrom et al. | |

OTHER PUBLICATIONS

Canadian Office Action dated Jun. 12, 2017 in corresponding Canadian Patent Application No. 2,930,445.

Canadian Office Action dated Feb. 29, 2016 for corresponding Canadian Application No. 2,876,721.

Singapore Office Action dated Aug. 28, 2017 in corresponding Singapore Patent Application No. 10201408820P.

* cited by examiner

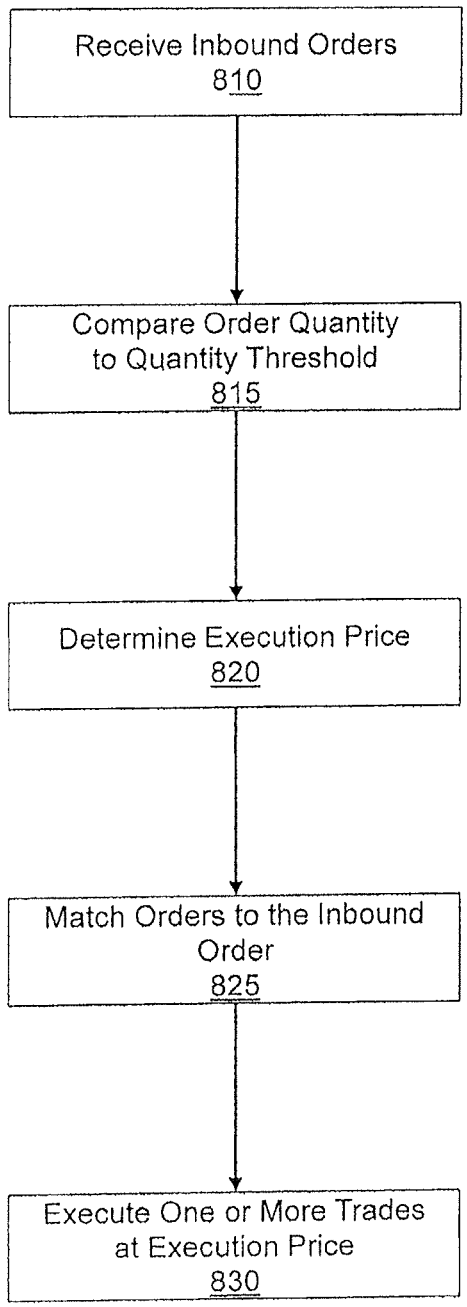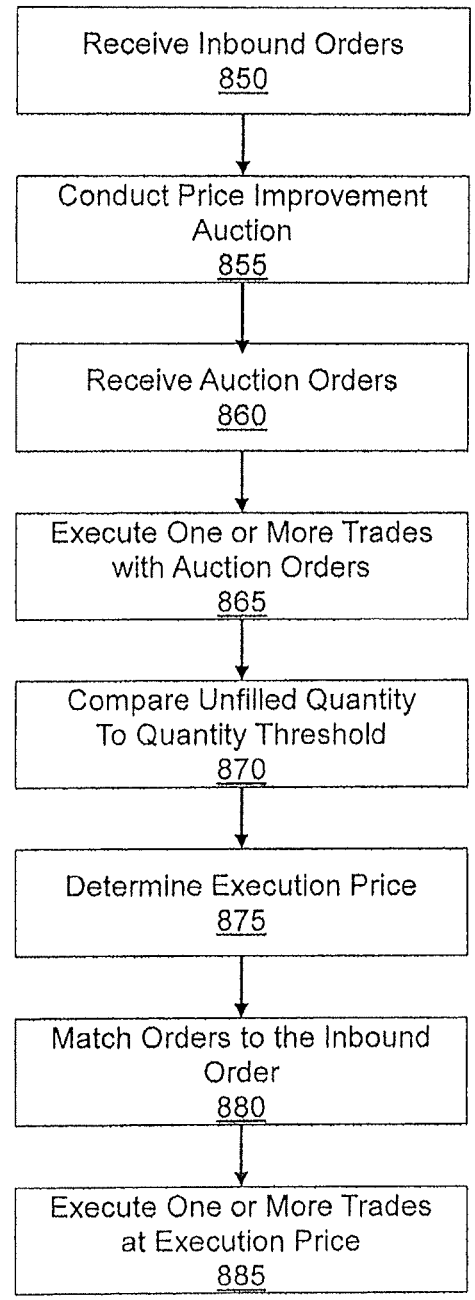
FIG. 8A
FIG. 8B

LARGE LIQUIDITY SEEKING TRADING PLATFORM

TECHNICAL FIELD

The disclosure generally relates to the field of electronic trading systems, and in particular, systems for handling limit and market orders.

BACKGROUND

The advent of certain types of trading has narrowed the spread between available best bids and best offers (defined below), which may decrease profits available to market participants. Additionally, the prices of markets may change significantly relative to bid-offer spreads, which could lead to unexpected losses for market participants. These (and other) factors may decrease available liquidity at the best bid and offer prices. As a result, orders (particularly large orders) may expect to receive prices differing from the best bid or best offer prices. Due to the lack of price predictability, market participants making certain types of orders must price these orders by manually contacting other market participants. This manual pricing process is inherently slow and error-prone. Additionally, orders priced outside of an exchange may not fetch an efficient price because some market participants are not consulted.

Accordingly, there is a need for systems, methods and apparatus for accurately and efficiently pricing orders, and for executing trades based on the determined prices.

SUMMARY

In one embodiment, a disclosed system, method and computer readable storage medium executes trades in a liquidity-seeking environment. An electronic trading system or exchange receives orders from market participants including agency brokers, market makers, and/or proprietary traders. A received order may specify at least a financial instrument, a quantity and a side of the order (e.g., buy or sell), and some received orders may specify a limit price. The exchange determines display prices (including a display bid price and a display ask price) based on specified limit prices and quantities of received orders. In one embodiment, the exchange determines cumulative quantities available at various prices based on the quantity offered by orders that would trade at the various prices given their limit prices. At the determined display price, the quantity available is greater than a display quantity threshold. The display bid may be chosen from the maximum eligible price given the criteria of orders on the buy side. The display offer may be chosen from the minimum eligible price given the criteria of orders on the sell side.

In one embodiment, the orders priced between the display bid price and the display offer price are kept in a blind book. The exchange may not inform participants about limit prices or quantities of orders in the blind book. The exchange may maintain a display book for non-crossing orders having limit prices at, or outside of the display price. Market participants may trade against the display book, receiving the display price (unless an order's quantity is greater than the quantity available at the display book and the order's limit price allows execution at a worse price than the display price).

In one embodiment, the exchange accepts orders that have a FAST execution instruction ("FAST orders") and orders that have a SLOW execution instruction ("SLOW orders"). FAST orders denote orders having a large quantity and desiring to trade with low latency. FAST orders with a quantity greater than or equal to an order quantity threshold may receive a price improvement when matched against marketable orders. FAST orders with a quantity less than or equal to the order quantity threshold may not trade at prices in the blind book.

In one embodiment, SLOW orders denote orders seeking price improvement that are insensitive to increased latency. A received SLOW order may generate a price improvement auction, which informs market participants of the SLOW order's side, quantity, and limit price. Market participants may respond to the price improvement auction by submitting additional orders. The SLOW orders may receive price improvement from the additional orders. The SLOW orders may trade against the display book if the additional orders do not fill the quantity of the SLOW orders at better prices.

In one embodiment, the exchange includes risk management functionality to identify irregular trades. Irregular trades may be identified based on a trade quantity and/or percentage above thresholds set by the exchange and/or market participants. Irregular trades may also be identified based on a series of trades having too many trades having a trade quantity or percentage above thresholds.

In one embodiment, the exchange monitors best bid and best offer prices at away exchanges and the NBBO (defined below). Based on availability of better prices at an away exchange, the exchange may route all or part of an order. The exchange may include execution instructions that determine how an order interacts with prices at away exchanges. Other execution instructions may cancel an order that is not filled immediately or after a price improvement auction.

In one embodiment, the exchange supports orders having multiple legs. The exchange handles these orders in one or more separate order books. The exchange may separate orders having multiple legs based on relative quantities of an order's legs, number of financial instruments in an order's legs, and use of legs that are together delta-neutral. The exchange may compare the prices of the one or more order books for multiple legs with prices of comparable order books at the exchange or other exchanges.

The disclosed embodiments beneficially allow for large quantities of financial instruments available to trade at predictable prices. The display price encourages liquidity providers to participate by offering a wider potential spread than standard markets. Market participants seeking to place large orders may receive improved prices and predictability compared to that received when manually contacting market participants outside an exchange FAST orders may reward liquidity providers by offering price improvement for aggressively priced orders and additionally offer quick trades. SLOW orders may offer potential price improvement for market participants. Risk management measures to identify erroneous trades may reduce risks of volatile markets due to accidental trades. Various execution instructions may provide market participants with flexibility to execute numerous trading strategies.

The features and advantages described in this summary and the following description are not all-inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures (or drawings). A brief introduction of the figures is below.

FIG. 8A illustrates an example flow chart for executing orders with a FAST execution instruction, consistent with one embodiment.

FIG. 8B illustrates an example flow chart for executing orders with a SLOW execution instruction, consistent with one embodiment.

DETAILED DESCRIPTION

Overview

Figure 1:
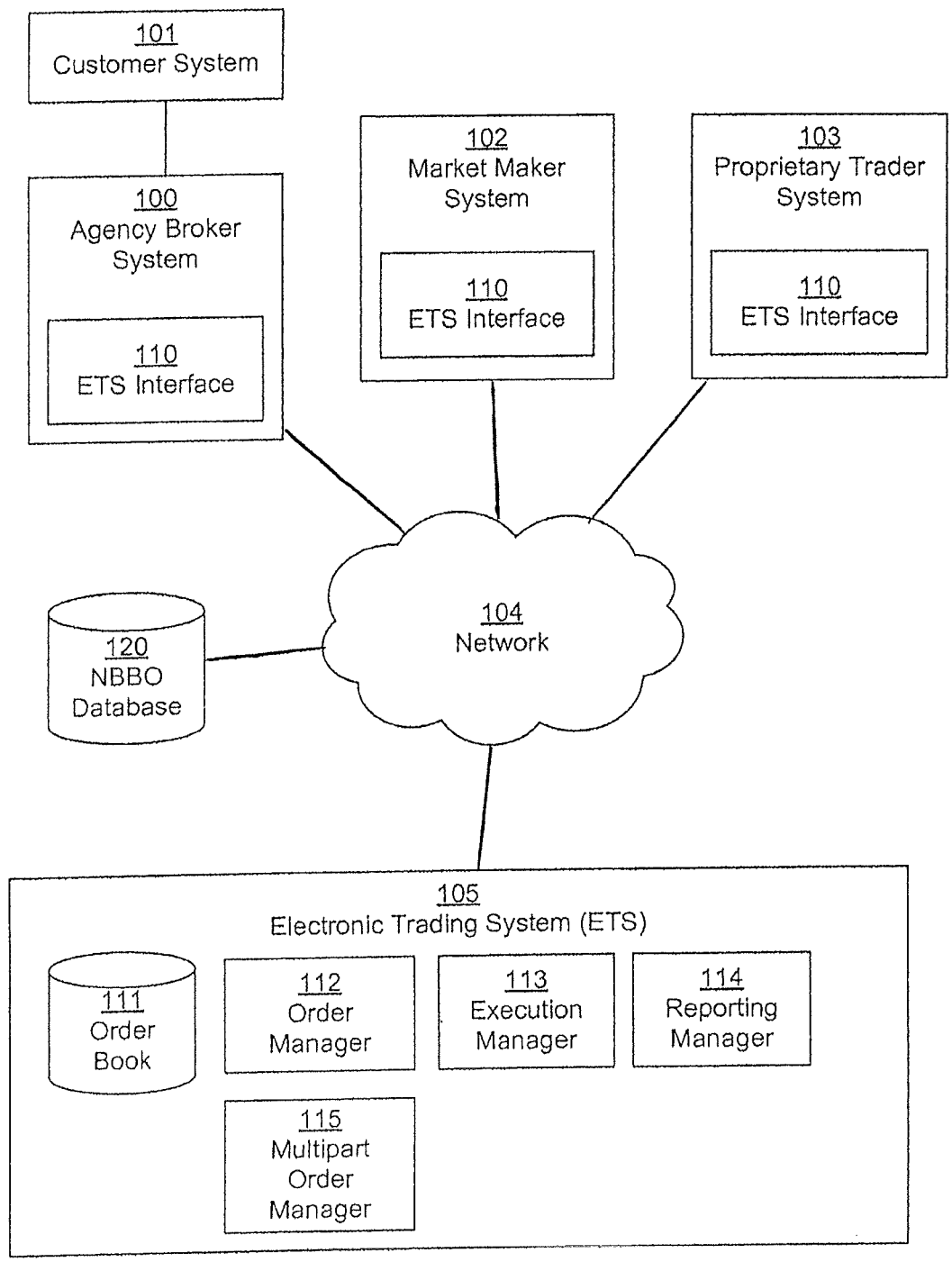
FIG. 1 illustrates a block diagram of a system architecture diagram of an electronic trading system (ETS) in a networked environment, consistent with one embodiment.

An electronic trading system may provide a central market place where both buyers and sellers (often referred to as traders or market participants) can buy or sell financial instruments. Traders may connect to the electronic trading system via their own trading computers, which may receive market data from the electronic trading system, and which may issue commands to buy or sell financial instruments. The issuance of commands to buy or sell financial instruments from a trading computer to the electronic trading system may be referred to as electronic trading (or trading, for short). Because electronic trading systems facilitate the exchange of various financial instruments, electronic trading systems are sometimes called electronic exchanges.

Electronic trading systems may facilitate the exchange of financial instruments such as cash, currency, a currency index, a commodity, a stock, a stock market index, a banknote, a bond, other financial instruments whose value is based at least in part on interest rates, an option, a futures contract, a swap, other derivatives, and other assets. An option is a derivative of another financial instrument. The option specifies an underlying financial instrument, a quantity of the financial instrument, a side, a strike price, an expiration time, and/or settlement terms. An option writer may sell the option to the option holder, who then has the right to buy or sell (according the side) the specified quantity of the underlying financial instrument at the strike price. This right may expire at the expiration time. The settlement terms may indicate how and/or when the option writer satisfies the obligation to the option holder upon exercise (e.g., when the underlying asset is delivered, if delivery takes the form of the financial instrument or its equivalent cash value). The settlement terms may additionally impose conditions on the expiration of the option. For example, European options may be exercised on expiration, whereas American options may be exercised at any time at or before expiration, and Bermudan options may be exercised at specified times at or before expiration. Example options include a call, which gives the holder a right to buy the underlying financial instrument at the stock price until the expiration date, and a put, which gives the holder the right to sell the underlying financial instrument at the stock price until the expiration date. Some options feature more complex dependency on one or more financial instruments and specify multiple sides, quantities, strike prices, and/or expiration dates.

Electronic trading systems may support limit orders and market orders of financial instruments. A limit order refers to an order to buy or sell a set quantity of financial instruments at a pre-determined price or better. Better denotes a higher price when selling and a lower price when buying. A market order refers to an order to buy or sell a set quantity of financial instruments at the prevailing market price until the specified quantity has been met or the order cancelled. A market order has no price at which to trade, so it is executed at whatever price is currently prevailing in the market. An electronic trading system may support stop orders, which specify an activation price and a set quantity of financial instruments to buy or sell. When the price reaches the activation price or worse, the stop order becomes a market order for the set quantity of financial instruments. Worse denotes a lower price when selling and a higher price when buying.

When a market participant issues an order to an electronic trading system to sell a financial instrument, the electronic trading system may attempt to match the sell order with an existing buy order that has a price that satisfies the seller's price requirements. Similarly, when a market participant issues an order to buy a financial instrument, the electronic system may attempt to match the buy order with an existing sell order. If a market participant issues a limit order that meets the limit order's price requirements, the limit order may be referred to as a marketable order and may execute against the counterparty order. If a market participant issues a limit order that cannot be matched to a counterparty order meeting the limit order's price requirements, then the limit order may be referred to as a non-marketable order.

Received orders may be stored in an electronic order book. The electronic order book may store unexecuted and/or non-marketable orders until a matching order can be found to execute the trade, or until the order is cancelled. Buy orders stored in the order book may be referred to as bids, and stored sell orders may be referred to as offers. The difference between a highest bid on the order book and a lowest offer may be referred to as a best bid-offer (BBO) spread. Price information about bids and offers for equity option contracts in various electronic markets in the United States are tracked by the Options Price Reporting Agency (OPRA). OPRA maintains a database of the best bids and offers for each tracked option called the National Best Bids and Offers (NBBO) database. The NBBO price refers to the prices of the best bid and the best offer while the NBBO spread refers to the price difference between the best bid and best offer.

Agency brokers may provide trading services for large volumes of customers, and may also trade for their own account, subject to the rules and regulations of the electronic markets and of the Securities and Exchange Commission (SEC). When a customer places an order to buy or sell equity options through an agency broker, the agency broker may have existing customer orders that can be matched against the order, or the agency broker may be able to act as a counterparty directly by trading for their own account. However, instead of directly executing such orders internally, an agency broker may be required, by rules or regulations, to place an order with an electronic exchange in case a third-party is willing to offer a better price for the customer's order than that offered internally by the agency broker. An electronic trading system may facilitate such orders.

Other market participants include market makers. Market makers may buy and sell orders of the same financial instrument, which increases market liquidity. To profit from trading, market makers may buy financial instruments at the lower bid price and sell them at the higher offer price. As the spread increases between the best bid and the best offer, the profits available to market makers increase. The spread between the best bid and the best offer may be determined in part by a minimum price variation (MPV), which sets the minimum difference between prices. When the MPV is 0.10 (as it is in dime trading), exchange prices are multiples of ten cents, and the bid-offer spread is a multiple of ten cents as well. In penny trading, the MPV is 0.01, so the bid-offer spread is a multiple of one cent. Due to the increased pricing granularity, penny trading may have narrower bid-offer spreads than dime trading.

The advent of penny and other types of trading may have the effect of narrowing the spread between the best bids and offers, which may decrease profits available to market participants. Additionally, the prices of markets may change significantly relative to the bid-offer spread, which could lead to unexpected losses for market participants. These (and other) factors may decrease available liquidity at the best bid and offer prices, so any large orders received can expect to receive prices differing from the best bid or offer. Additionally, large orders priced outside of an exchange may not fetch an efficient price because some market participants are not consulted. As further discussed below, systems, methods and computer readable medium according to this disclosure address these and other deficiencies.

The Figures (FIGS.) and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Exemplary System Architecture

Turning now to FIG. 1, illustrated is a system architecture diagram of one example embodiment of an electronic trading system (ETS) in a networked environment. The system environment comprises market participants including one or more customer systems 101, agency broker systems 100, market maker systems 102, and proprietary trader systems 103. These systems 100-103 may be coupled to the ETS 105 through a wired and/or wireless network 104. The ETS 105 may also communicate with the NBBO database 120 through the network 104. Although only a single one of each type of market participant is illustrated in FIG. 1, the environment may include any number of each, as well as fewer, additional and/or alternative types of market participant systems in practice.

The customer systems 101 may comprise systems operated by customers that can issue electronic orders to buy or sell financial instruments in accordance with the needs of those customers. The customer systems 101 may communicate the electronic orders to the agency broker systems 100, either directly or through the network 104. The customer systems 101 may be personal computers, laptops, smart phones, tablet computers, computer servers, or any other systems capable of issuing electronic communication.

The agency broker systems 100 may be operated by agency brokers and may be configured to receive electronic orders from one or more customer systems 101. The agency broker systems 100 may include an ETS interface 110 that enables communication with the ETS 105. The agency broker systems 100 can issue orders to buy and sell financial instruments on behalf of customers, or they may issue orders for the agency brokers' own accounts. Orders may be sent through the ETS interface 110 to the ETS 105. Confirmations of issued orders may be received through the ETS interface 110 as well. The ETS interface 110 may provide standard electronic communications capabilities such as encryption, compression, routing, quality of service guarantees, and error correction.

The market maker systems 102 may be operated by market makers. Market makers buy and sell financial instruments with the aim to profit from the spread between the bid price and the offer price. Because market makers may place non-marketable limit orders, market makers may provide liquidity in a financial market. At a given time, market makers may simultaneously place buy and sell orders on the same financial instrument through the ETS 105. The market maker system 102 may also include an ETS interface 110 that enables market makers to place orders with the ETS 105 and receive pricing and transactional information from the ETS 105.

The proprietary trader systems 103 may be operated by proprietary traders (PTs). PTs may be similar to agency brokers 100, but PTs may place orders on behalf of themselves rather than on behalf of customers. PT systems 103 may include an ETS interface 110 that enables PTs to place orders with the ETS 105 and receive pricing and transactional information from the ETS 105. PTs may engage in long, short, hedge, or arbitrage strategies and place orders on one or more sides of financial instruments. In some instances, a firm may engage in both proprietary trading and market making, so that the firm may have a trader system with characteristics of both a market maker system 102 and a PT system 103.

The ETS 105 may comprise an electronic market that matches orders received from the market participant systems 100-103 against each other. The ETS 105 may receive orders specifying a financial instrument, a quantity, and a side. For instance, the ETS 105 can match an order to sell a particular financial instrument from an agency broker against a different order to buy the same financial instrument from a market maker, based on compatibility between the price criteria of the two orders. The ETS 105 may determine a display price based on received orders. At the displayed price, the ETS 105 may provide available liquidity above a display quantity threshold. The ETS 105 may offer multiple order execution instructions including FAST and SLOW. The ETS 105 may enforce risk management policies and processes orders according to execution instructions.

Exemplary Electronic Trading System

In the illustrated embodiment, the ETS 105 of FIG. 1 includes one or more modules (defined below), such as an order book 111, an order manager 112, an execution manager 113, a reporting manager 114, and a multipart order manager 115. The ETS 105 may include additional modules, fewer modules, and/or alternate modules that provide similar and/or alternative functionality.

The order book 111 may comprise a data storage module that stores orders received from the agency broker systems 100 and market maker systems 102. The orders may be stored in records that specify the ordered financial instrument, the order price, the identity of the ordering party, the order's execution instructions, the order placement time, the order quantity and additional or alternative information. An order's execution instructions may specify one or more cancellation conditions, interaction with other exchanges, and conditions for execution. Some of this information may be omitted from order records (e.g., market orders may omit an order price). The ETS 105 may provide information from the order book 111 to market participant system 100-103 on request. This information may be used by the agency brokers and market makers, for example, to determine the price of various financial instruments in a current financial market. Some information from the order book 111 may be withheld from market participants (e.g., the identity of an ordering party may be withheld). In one embodiment, the order book 111 segregates orders into a display book and a blind book based on the orders' limit prices and display price(s).

The order book 111 may store simple orders having a single leg and multipart orders having multiple legs. A leg, as used herein, is another term for an order. In a multipart order, a leg may be contingent on execution of another leg of that order. In the context of options trading, for example, a multipart order may have legs specifying different strike prices, sides, and/or financial instruments. In one embodiment, the order book 111 may maintain a display book for simple orders separate from one or more books for multipart orders. Multipart orders may be stored in different books based on the characteristics of the multipart order.

The order manager 112 may match buy and sell orders in the order book 111 against each other to create transactions. These transactions may be matched based on a priority parameter, such as price priority, for example. Other factors, such as time priority (or any other priority parameter), may be used as a secondary priority. For example, suppose the order book 111 has three limit orders to sell shares of ACME Company. One order is from broker X, to sell 10 shares of ACME Company at a price of at least $50 per share, received on January 1st. Another order is from broker Y, to sell 15 shares of ACME Company at a price of at least $50, received on January $2^{nd}$. The final order is from broker Z, to sell 5 shares of ACME Company at a price of at least $40, received on January $3^{rd}$. Further, suppose the order book 111 receives a new limit order from agency broker W to buy 25 shares of ACME Company at a price of at most $55. The order manager 112 may match the 5 shares of broker Z's sell order against broker W's buy order first because broker Z offers the best selling price. Next, the 10 shares of broker X's sell order may be executed against broker W's buy order because broker X's sell order was received prior to broker Y's sell order. Finally, the remainder of broker W's buy order (5 shares) may execute against a portion of broker Y's sell order.

The order manager 112 may match orders stored in the order book 111 until no more transactions can be completed. When the possible order matches have been exhausted, the lowest priced sell order for a given financial instrument is priced higher than the highest priced buy order. These remaining orders may be referred to as non-marketable orders because they will not execute at prevailing prices. In some instances, the execution manager 113 may block execution of orders even though an order's pricing criteria are met. As new orders are received by the ETS 105, the order manager 112 may attempt to match them against existing orders in the order book 111. Those orders that can be matched at prevailing prices are referred to as marketable orders. Orders that cannot be matched against an existing order are referred to as non-marketable orders and may be stored in the order book 111 until they are marketable. The order manager 112 may execute received market orders against a current highest-priced buy order or lowest-priced sell order stored in the order book 111, subject to restrictions enforced by the execution manager 113. The order manager 112 may route a portion of an order or an entire orders to another exchange based on information received from the NBBO database 120. An order may be routed when the order is marketable at the away exchange and the away exchange offers a better price, as reported by the NBBO database.

In one embodiment, the order manager 112 determines best bid-offer (BBO) prices, which includes the best bid and the best offer. The best bid refers to the highest price at which an order to buy may execute. The best offer refers to the lowest price at which an order to sell may execute. The order manager 112 may also determine display prices, including a display bid and a display offer, which may differ from the BBO prices.

Market participants may designate execution instructions for orders that determine order handling. In one embodiment, possible execution instructions include FAST or SLOW. The order manager 112 may have different handling procedures for an order with a FAST or a SLOW execution instruction (a "FAST order" or a "SLOW order," respectively). FAST orders may offer quick execution of a high quantity against the display price. SLOW orders may offer slower execution in exchange for possible price improvement. The order manager 112 may initiate price improvement auctions in response to receiving an order. Such auctions may invite counter-orders from market participants and last a random duration of time, in one embodiment.

The execution manager 113 may enforce regulations and policies of the ETS 105 over the operation of the order manager 112. The execution manager 113 may ensure that the ETS 105 does not execute orders at worse prices than those reported by the NBBO database 120. The execution manager 113 may also enforce risk management protections. These risk management protections may identify apparently erroneous trades based on an order quantity threshold or a threshold on the percentage of order filled. The risk management protections may consider a single trade, a number of recent trades, or trades within a recent time period. When the execution manager 113 identifies an erroneous trade, the execution manager 113 may temporarily halt trading, cancel or bust the identified order, bust recently completed orders, and/or cancel outstanding orders.

The execution manager 113 may additionally monitor trades against information from the NBBO database 120 to prevent execution at prices worse than the NBBO. Orders may specify order execution instructions. These order execution instructions may indicate conditions for cancelling an order of fulfilling the order. The execution manager 113 may cancel orders in accordance with execution instructions and block trades from executing contrary to one of the involved order's execution instructions.

The reporting manager 114 may transmit information about the ETS 105 to market participant systems 100-103 and the NBBO database 120. Transmitted information may include characteristics of executed orders (e.g., posting prices, quantity exchanged), characteristics of orders in the order book 111 and/or any other desired information. Transmitted information may omit some orders in accordance with exchange policies; for example, a market participant's identity may be omitted. The reporting manager 114 may optionally avoid or refrain from transmitting information about orders that post blind to the order book 111. Orders may post blind based on execution instructions (e.g., stop market orders that have not reached an activation price), or based on a limit prices (e.g., non-marketable orders with limit prices between the display prices). The reporting manager 114 may transmit risk management information such as parameters of policies enforced by the execution manager 113. Market participant systems 100-103 may display received information on their ETS interfaces 110. The reporting manager 114 may report the display prices to the NBBO Database 120. The reporting manager 114 may include a web server, or an application programming interface (API) for communicating through the network 104.

The multipart order manager 115 may handle multipart orders from the order book 111. The multipart order manager 115 may govern interactions between multipart orders and single-legged orders. The ETS 105 may support matching of simple orders with legs of complex-legged orders or may match these orders separately. The multipart order manager 115 may compare bid and offer prices between the order books for simple orders and multipart orders. In response to pricing discrepancies between simple orders and multipart orders, the multipart order manager 115 may take actions including notifying market participants of the discrepancy and initiating a price improvement auction.

Exemplary Computer System

Figure 2:
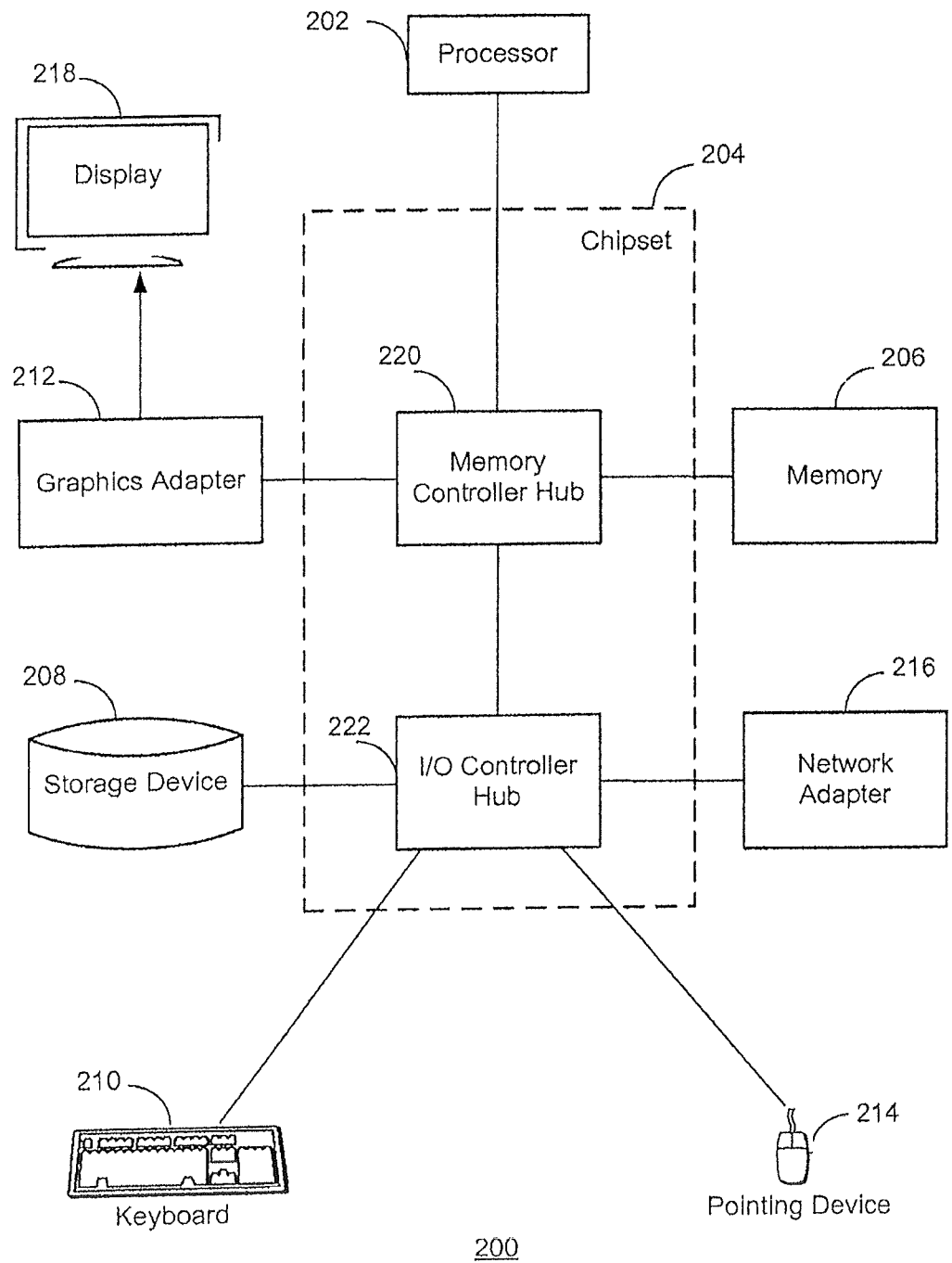
FIG. 2 illustrates a high-level block diagram of an example computer, consistent with one embodiment.

The customer system 101, the agency broker system 100, the market maker system 102, the PT system 103, and the ETS 105 may be implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 may be coupled to the memory controller hub 220, and a display 218 may be coupled to the graphics adapter 212. A storage device 208, keyboard 210, pointing device 214, and network adapter 216 may optionally be coupled to the I/O controller hub 222. Other embodiments of the computer 200 have different architectures with fewer, additional and/or alternative components.

The storage device 208 may comprise a non-transitory computer-readable storage medium such as a hard drive, compact disk read-only memory (CD-ROM), DVD, a solid-state memory device, etc. The memory 206 may hold instructions and data used by the processor 202. The processor 202 may include one or more processors 202 having one or more cores that execute instructions. The pointing device 214 may comprise a mouse, track ball, or other type of pointing device, and may be used in combination with the optional keyboard 210 (or other input device) to input data into the computer 200. The graphics adapter 212 may display images and other information on the display 218. The network adapter 216 couples the computer 200 to one or more computer networks.

The computer 200 may be adapted to execute computer program modules for providing functionality described herein including (without limit) price matching mechanisms, price improvement auctions, display price determination, irregular trade identification, and order routing. As used herein, the term "module" refers to computer program logic used to provide the specified functionality. Thus, a module can be implemented in hardware, firmware, and/or software. In one embodiment, program modules such as the order manager 112, execution manager 113, and reporting manager 114 may be stored on the storage device 208, loaded into the memory 206, and executed by the processor 202.

The types of computers 200 used by the market participants and the ETS 105 of FIG. 1 can vary depending upon the embodiment and the processing power required by the entity. For example, the ETS 105 might comprise multiple blade servers working together to provide the functionality described herein. The computers 200 may contain duplicates of some components or may lack some of the components described above (e.g., a keyboard 210, a graphics adapter 212, a pointing device 214, a display 218, etc.). For example, the ETS 105 can run in a single computer 200 or multiple computers 200 communicating with each other through a network such as in a server farm.

Exemplary Display Price

Figure 3:
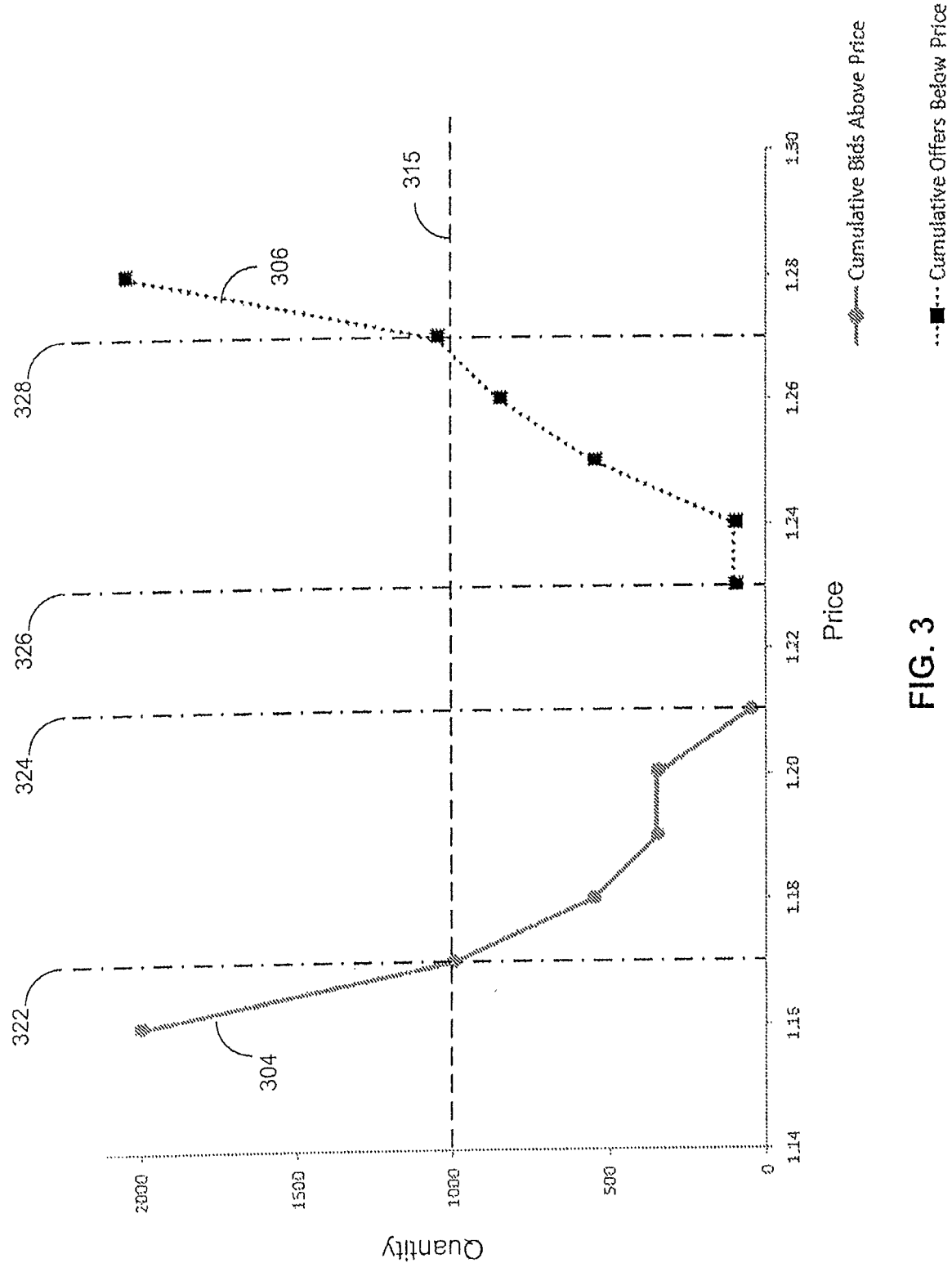
FIG. 3 illustrates an example price diagram demonstrating quantities of financial instruments available at different prices, consistent with one embodiment.

FIG. 3 illustrates an example price diagram demonstrating quantities of financial instruments available at different prices, consistent with one embodiment. The price diagram includes cumulative bids 304 and cumulative offers 306 available at given prices. The price diagram also demonstrates the display quantity threshold 315, the display bid 322, the best bid 324, the best offer 326, and the display offer 328. The illustrated prices and quantities depend on example non-marketable limit orders in the order book 111.

The cumulative bids 304 show the quantity desired for purchase at or above a given price. As the price decreases, more quantity is desired for purchase. For example, suppose 50 are desired for purchase at a limit price of 1.21, 300 are desired for purchases at a limit price of 1.20, and zero are desired for purchase at a limit price of 1.19. The resulting cumulative bids 304 are 50 at 1.21, 350 at 1.20, and 350 at 1.19. The cumulative offers 306 show the quantity available for sale at or below a given price. As the price increases, more quantity is available for sale. For example, suppose 100 are available for sale with a limit price of 1.23 and 450 are available for sale with a limit price of 1.25. The resulting cumulative offers 306 are 100 at 1.23, 100 at 1.24, and 550 at 1.25.

The best bid 324 is the highest price of an order on the buy side. The best offer 326 is the lowest price of an order on the sell side. In one embodiment, the display bid 322 is the highest price where the quantity of cumulative bids 304 is at least greater than the display quantity threshold 315. The display offer 328 is the lowest price having a quantity of cumulative offers 306 at least greater than a display quantity threshold 315. For the example orders illustrated in FIG. 3, the display quantity threshold 315 is 1000. Since 1000 are desired for purchase at or above 1.17, the display bid 322 is 1.17. Similarly, the display offer 328 is 1.27 because 1050 are available for sale at or below 1.27. The display bid 322 and display offer 328 differ from the best bid 324 and best offer 326 when the quantities available at the BBO prices are lower than the display quantity threshold 315. As the bid price decreases, the quantity that other market participants are willing to buy increases, so the display bid 322 is typically lower than the best bid 324. As the offer price increases, the quantity that other market participants are willing to sell increases, so the display offer 328 is typically higher than the best offer 326.

Exemplary Order Manager

Figure 4:
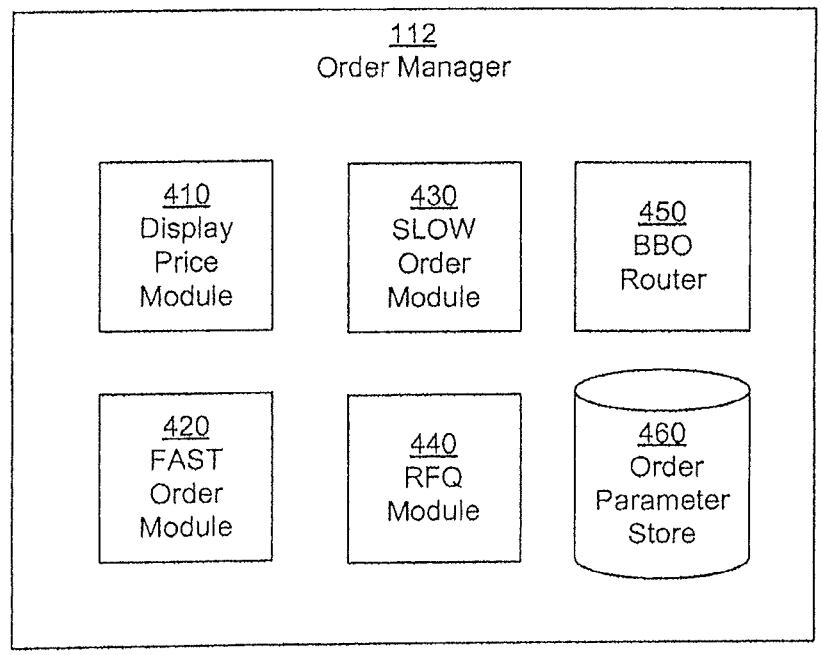
FIG. 4 illustrates a block diagram of an example order manager for implementing a large liquidity-seeking ETS, consistent with one embodiment.

FIG. 4 illustrates a block diagram of an example order manager 112 for implementing a large liquidity-seeking ETS, consistent with one embodiment. The example order manager 112 includes a display price module 410, a FAST order module 420, a SLOW module 430, a request for quotation (RFQ) module 440, a BBO router 450 and an order parameter store 460. The order manager 112 may include additional modules, fewer modules, and/or alternate modules that provide similar, additional and/or alternative functionality.

The display price module 410 may be configured to determine the display bid 322 and the display offer 328. The determined display bid 322 and display offer 328 may be broadcast to market participants through the reporting manager 114, for example. The display price module 410 may receive orders from the order book 111. For different prices, the display price module 410 may determine a cumulative quantity of orders available at that price. For the cumulative bids 304, the display price module 410 may determine the total quantity of buy orders having limit prices at or above a price. For the cumulative offers 306, the display price module 410 may determine the total quantity of sell orders having limit prices at or below a price. If the determined total quantity exceeds the display quantity threshold 315 at a price, then that price may be an eligible display price. The display bid 322 may be selected from the eligible prices for buy orders based on the highest price. The display offer 328 may be selected from the eligible prices for sell orders based on the lowest price.

The display price module 410 may determine if a received order is marketable against the display price. If a received order to buy has a limit price at or above the display offer 328, or if a received order to sell has a limit price at or below the display bid 322, then the received order may be deemed marketable against the display price. Market orders may also be considered marketable against the display price. In one embodiment, orders with limit prices more aggressive than the display price may post to a blind order book. An order to buy with a limit price greater than the display bid 322, or an order to sell with a limit price less than the display offer 328, may be deemed be more aggressive than the display price. Orders in the blind order book may be invisible to market participants. Market participants may see the cumulative quantity available at prices equal to or more aggressive than a display price, but they may be prevented from seeing the individual orders. Orders with limit prices less aggressive than the display may be posted to a display order book. The reporting manager 114 may communicate prices and quantities of orders in the display order book.

The FAST order module 420 may process orders having a FAST execution instruction. Handling of a FAST order may depend on the order's quantity. If, for example, an incoming FAST order's quantity is greater than or equal to an order quantity threshold, then it may be treated as a large FAST order. A large FAST order may trade against orders in the display book and orders in the blind order book. If the large FAST order is marketable, then the large FAST order may execute at the best price for that FAST order that fulfills the FAST order's quantity. If the large FAST order is non-marketable, then the FAST order may post to the order book 111. If a large FAST order is marketable but cannot fill its full quantity at its display price, then the large FAST order may execute against the available quantity at its limit price, and the remainder may post to the order book 111 if the order's execution instructions do not require immediate fulfillment. If the remaining quantity of the FAST order is not greater than or equal to the order quantity threshold, the remainder of the large FAST order may be treated as a small FAST order.

If a FAST order's quantity is less than the order quantity threshold, then the order manager 420 may handle the order as a small FAST order. If a small FAST order is marketable against the display price, then the small FAST order may execute at the display price. If the small FAST order is non-marketable against the display price, then the small FAST order may be posted to the blind order book. The display price module 410 may consider the small FAST order for calculating the cumulative quantities used to determine display prices. If the small FAST order becomes marketable against the display price, then the FAST order module 420 may execute the small FAST order.

Large FAST orders that execute against a received marketable order may receive price improvement. The FAST order module 420 may match counter orders to a marketable order based on a priority parameter, such as (for example) price priority. For example, suppose the order book 111 has limit orders to buy including Order A for 100 at 1.20, Order B for 200 at 1.19, and Order C for 400 at 1.18. If the ETS 105 receives a FAST order to sell 500 at a limit price of 1.17, then the FAST order module 420 may match the incoming order against Orders A, B, and C. Orders A and B execute with their full quantities at 1.18, and 200 of Order C executes at 1.18. Order C receives a partial allocation because its pricing priority is lower than Orders A and B. If there are multiple orders having similar pricing priority, then other secondary priority methods may be used (e.g., time priority, pro-rata by quantity).

If a FAST order is marketable against the display price but the order's quantity exceeds the quantity available at the order's limit price, the BBO router 450 may first send at least part of the FAST order to receive away BBO prices better than the display price at the ETS. The FAST order may next trade against the available quantity at its limit price. The RFQ module 440 may then request quotations through a price improvement auction at the order's limit price. If the order does not cancel according to an execution instruction, the remaining quantity of the order may be treated as a large FAST order or a small FAST order depending on the remaining quantity of the order.

The SLOW order module 430 may be configured to process orders having a SLOW execution instruction. When the ETS receives a SLOW order, the order manager 112 may initiate a price improvement auction through the RFQ module 440. If other exchanges offer more advantageous prices, then the BBO router 450 may send at least part of the order's quantity to an away exchange with a better price. The SLOW order may trade against the responses to the price improvement auction up to the order's limit price. The SLOW order module 430 may handle a SLOW order's remaining quantity. If the SLOW order's quantity is greater than or equal to an order quantity threshold, then the SLOW order module 430 may treat the order as a large SLOW order. Large SLOW orders can trade against the display price or orders posted blind to the order book 111. Similar to a large FAST order, a large SLOW order may be matched against orders at the best price for the SLOW order that fulfills the SLOW order's desired quantity. If a large SLOW order is non-marketable, then the SLOW order posts to the order book 111. If the SLOW order's quantity is less than an order quantity threshold, then the SLOW order module 430 may treat the order as a small SLOW order. Small SLOW orders may trade at the display price if marketable against the display price.

The RFQ module 440 may be configured to initiate price-improvement auctions for SLOW orders and FAST orders. FAST orders may not have a price-improvement auction, but the FAST order module 420 may use the RFQ module 440 when a received FAST order is marketable against the display price and requests a quantity greater than the quantity available at the order's limit price. The price improvement auction may include one or more rounds. The duration of a round may be determined at least in part by a random auction time, a predetermined time, and/or any other time-determining means. The RFQ module 440 may initiate a timer that expires at a time between a minimum auction time and a maximum auction time. Market participants may or may not be informed when an auction round ends until the timer expires.

In one embodiment, a price-improvement auction has a single round. The reporting manager 114 may announce the initiating order's quantity and price to market participants. The RFQ module 440 may query away BBOs from the NBBO database 120. If the away BBOs offer better prices than the display prices at the ETS 105, then the RFQ module 440 may use the BBO router module 450.

The ETS 105 may receive order for execution against the initiating orders. The RFQ module 440 may match these received orders against the initiating order based on price priority. The RFQ module 440 may also match the initiating order to the orders posted blind to the order book at the display price if the initiating order is marketable at the display price. If one embodiment, pro-rata allocation may be used to allocate quantity among orders with similar price priority. Orders may execute at the limit price of the orders responding to the price initiation auction, provided that this limit price meets the initiating order's limit price.

For example, suppose a SLOW order is received to buy 10,000 at 1.32 or less, 1,000 are available at the NBBO price of 1.24 or more, and 20,000 are available at the display price of 1.28. Also suppose that the RFQ module 440 may initiate a price improvement auction, and when the auction timer expires, the ETS 105 has received several orders. Further, suppose that the received orders include Order G to sell 1,000 at a limit price of 1.25, Order H to sell 2,000 at a limit price of 1.26, Order I to sell 4,000 at a limit price of 1.27, and Order J to sell 5,000 at a limit price of 1.28. The BBO router 450 may route 1,000 at the NBBO price of 1.24. The RFQ module 440 may match 7,000 of the initiating order with Orders G, H, and I to trade at the received orders' respective limit prices. The remaining 2,000 may be split on a pro-rata basis between orders in the display price at 1.28 and Order J. The resulting pro-rata allocation results in 1,600 traded against orders posted blind at the display price of 1.28 and 400 traded against order J at its limit price of 1.28. Thus, the initiating order in this example is filled and Order J is partially filled with 4,600 remaining.

In an alternate embodiment, the RFQ module 440 may monitor the away BBO prices of away exchanges. If during the price improvement auction the NBBO database 120 reports an away BBO price that is better for the initiating order than the display price at the ETS 105, then the BBO router 450 may send at least a part of the order to receive the away BBO price. Routing part of an order to an away BBO may extend the duration of a price improvement auction. In an alternate embodiment, the RFQ module 440 may conduct a price improvement auction with multiple rounds and monitors the NBBO price reported by the NBBO database 120. At the expiration of an auction round, the BBO router 450 may send at least part of the order to receive the NBBO price. The RFQ module 440 may execute orders received for the price improvement auction if those order have prices equal or better than the NBBO from the perspective of the initiating order.

The BBO router module 450 may dispatch orders received at the exchange to other exchanges. To satisfy regulations, the BBO router module 450 may route an order to receive the NBBO price. In one embodiment, some orders may have execution instructions that mandate trading against all away BBOs that are more favorable than the BBO at the ETS 105. The BBO router module 450 may dispatch at least portions of these orders to receive favorable away BBO prices. The BBO router module 450 may handle routing of an intermarket sweep order (ISO), which routes portions to receive favorable away BBO prices and then executes the remainder at the ETS 105 before receiving updated away BBO prices.

The order parameter store 460 may store parameters used by the order manager 112 and its component modules. For example, the order parameter store 460 may include the display quantity threshold accessed by the display price module 410 and the order quantity threshold used by the FAST order module 420 and the SLOW order module 430. Alternately or additionally, the order parameter store 460 may have a first order quantity threshold for the FAST order module 420 and a second order quantity threshold for the SLOW order module 430. The order parameter store 460 may also store the minimum auction time and the maximum auction time used by the RFQ module 440, as well as any other desired information and data.

Exemplary Execution Manager

Figure 5:
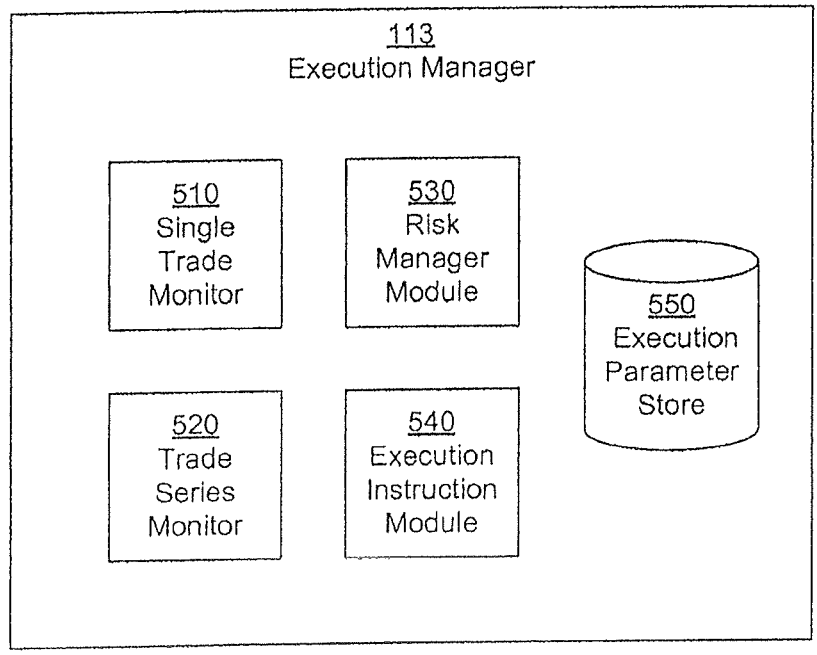
FIG. 5 illustrates a block diagram of an example execution manager for implementing a large liquidity-seeking ETS, consistent with one embodiment.

FIG. 5 illustrates a block diagram of an example execution manager 113 that may be configured for implementing a large liquidity-seeking ETS, consistent with one embodiment. The example execution manager 113 includes a single trade monitor 510, a trade series monitor 520, risk manager module 530, an execution instruction module 540, and an execution parameter store 460. The execution manager 113 may include additional modules, fewer modules, and/or alternate modules that provide similar, additional and/or alternative functionality.

The single trade monitor 510 may identify irregular trades based on one or more single-trade thresholds such as (for example) a single-trade quantity threshold and a single-trade percentage threshold. If the quantity transacted in a trade is greater than or equals the single-trade quantity threshold, then the single trade monitor 510 may recognize the trade as irregular.

A trade may be associated with a percentage based on the quantity of the trade compared to the quantity of an involved order. For example, two orders having quantities of 100 and 200 are matched. The orders will trade 100, so the trade has a percentage of 100% with respect to the first order and 50% with respect to the second order. If a percentage associated with a trade is greater than or equals the single-trade fraction threshold, then the single trade monitor 510 may recognize the trade as irregular. Alternately or additionally to percentage, the single trade monitor 510 may consider the quantity fraction of a trade relative to the orders involved.

The single trade monitor 510 may report irregular trades to the risk manager module 530. In one embodiment, the single trade monitor 510 reports trades that breach the single-trade quantity threshold and the single-trade percentage threshold. Alternately or additionally, the single trade monitor 510 may report trades that breach one or more of the single-trade thresholds. Market participants may provide the ETS 105 with one or more single-trade thresholds applicable to their orders. The supplied thresholds may apply to all of a market participant's orders, orders for a particular financial instrument, orders for a group of financial instruments, and/or individual orders. The ETS 105 may set alternate or additional single-trade thresholds for all market participants or groups of market participants. For example, the ETS 105 may set a higher single-trade quantity threshold for trades from market maker systems 102 than for trades from agency broker systems 100. In one embodiment, the ETS 105 may set the single-trade percentage threshold at 100% and solicit market participants to configure their own single-trade quantity threshold.

The trade series monitor 520 may identify irregular series of trades based on one or more trade-series thresholds such as a trade-series quantity threshold and a trade-series percentage threshold. The trade series monitor 520 may identify a series of trades based on a trade series number. For example, the trade series monitor 520 may identify the last five trades as a trade series when the trade series number is five. Alternately or additionally, the trade series monitor 520 may identify a series of trades based on a trade series duration. For example, if the trade series duration is 20 milliseconds (ms), the trade series monitor 520 may identify trades occurring within the last 20 ms as a trade series. In one embodiment, the trade series monitor 520 may identify a trade series from trades of a financial instrument. Alternately or additionally, the trade series monitor 520 may identify a trade series from trades of a financial instrument involving a particular market participant.

The trade series monitor 520 may check the trades in an identified trade series against one or more trade-series thresholds. The trade series monitor 520 may flag trades in a trade series that breach one or more trade-series thresholds. If the quantity transacted in a trade is greater than or equals the trade-series quantity threshold, then the trade series monitor 520 may flag the trade. If a percentage associated with a trade is greater than or equals the trade-series fraction threshold, then the trade series monitor 520 may flag the trade. In an alternate embodiment, the trade series monitor 520 may flag trades that breach multiple trade-series thresholds. If the number of flagged trades exceeds a flagged-trades number threshold, then the trade series monitor 520 may identify the trade series as irregular. Alternately or additionally, if the percentage of flagged trades relative to the number of trades in the trade series exceeds a flagged-trades percentage threshold, then the trade series monitor 520 may identify the trade series as irregular.

The trade series monitor 520 may report trades series identified as irregular to the risk manager module 530. Similar to the single-trade thresholds, the trade-series thresholds may be configured by a market participant and/or set by the ETS 105. A market participant may elect not to configure trade-series thresholds in one embodiment. The ETS 105 may set the number or percentage of flagged trades that triggers the trade series monitor 520 to identify a trade series as irregular, or a market participant may elect to set the number or percentage.

The risk manager module 530 may be configured to receive trades or trade series that the single trade monitor 510 and trades series monitor 520 have identified as irregular. In response to receiving an irregular trade or trades series, the risk manager module 530 may temporarily halt trade execution. While execution is halted, market participants may cancel or update orders in the order book 111. A trading halt may last for any desired duration, such as 20 to 50 ms, in one embodiment. The risk manager module 530 may cancel or bust an irregular trade or trades in an irregular trade series. The risk manager module 530 may also cancel or bust trades executing concurrently with the irregular trade or trades series.

The execution instruction module 540 may enforce execution instructions associated with an order. For example, some execution instructions may specify when to cancel an order (e.g., at the end of trading, at the end of extended trading, at a particular time). Other execution instructions may cancel an order upon certain conditions. For example, an immediate-or-cancel (IOC) execution instruction may cancel a remaining order quantity that the ETS 105 has not filled. For example, the ETS 105 may receive a FAST order with a limit price at the display price and desired quantity that exceeds the quantity available at the display price. The FAST order trades against the quantity available at the display price, and if the FAST order has an IOC execution instruction, the execution instruction module 540 may cancel the remaining quantity The execution instruction module 540 may enforce execution instructions that specify how an order is fulfilled. For example, an all-or-nothing (AON) execution instruction prevents an order from executing in a trade that fulfills a partial quantity of that order. Similar to AON, the fill-or-kill (FOK) execution instruction specifies the quantity of the order to be filled in a single trade, but the FOK execution instruction may also cancel the trade if the ETS 105 cannot presently fill the order in full.

The execution instruction module 540 may enforce execution instructions that determine how an order interacts with prices at other exchanges. FAST orders may be designated with NOW or WOW execution instructions. When an order has a NOW execution instructions, the BBO router 450 may send at least part of the order to an exchange offering the NBBO price unless the display price at the ETS 105 is better for the order than the NBBO price. The FAST order module 420 may then match the NOW order with other orders within its limit price. Any unmatched order quantity may be canceled rather than posted to the order book 111. An order with a NOW execution instruction may combine a NBBO sweep with the IOC execution instruction.

A WOW execution instruction is similar to the NOW execution instruction, but the BBO router 450 may send at least parts of the order to away exchanges having a better BBO price than the display price at the ETS 105. Similar to a NOW order, the FAST order module 420 may process the remainder of the WOW and cancel any unfilled quantity of the order like an order with IOC execution instructions.

The execution instruction module 540 may also enforce execution instructions that determine how SLOW orders interact with prices at other exchanges. SLOW orders may be designated with a HNBC execution instruction or a cancel after auction timer expires (CAT) execution instruction. To process an order with a HNBC execution instruction, the BBO router 450 may send the HNBC order to away exchanges having better BBOs than the display price at the ETS 105, similar to a WOW execution instruction. The SLOW order module 430 may handle the remaining, un-routed quantity of the HNBC order. The RFQ module 440 may initiate a price improvement auction for the HNBC order. The CAT order execution instruction designates that an order is handled as a SLOW order, but the order cancels any remaining quantity after the price improvement auction. When the ETS receives a CAT order, the RFQ module 440 may initiate a price improvement auction. Once the price improvement auction has expired, the SLOW order module 430 may handle matching, and the remaining quantity (if any) may be canceled.

The execution parameter store 550 may be configured to store parameters used by the execution manager 113 and its component modules. For example, the execution parameter store 550 may include the single-trade quantity threshold and the single-trade percentage threshold that the single trade monitor 510 considers. Other example parameters may include the trade-series quantity threshold, the trade-series percentage threshold, the trade series number, the trade series duration, the flagged trades number threshold, the flagged trades percentage threshold that the trade series monitor 520 considers and/or any other desired parameter. The execution parameter store 550 may include an execution delay duration used when the risk manager module 530 halts trading. In one embodiment, market participants configure some of the execution parameters; and the execution parameter store 550 contains different parameters for use depending on the market participants involved in a trade.

Multipart Order Manager

Figure 6:
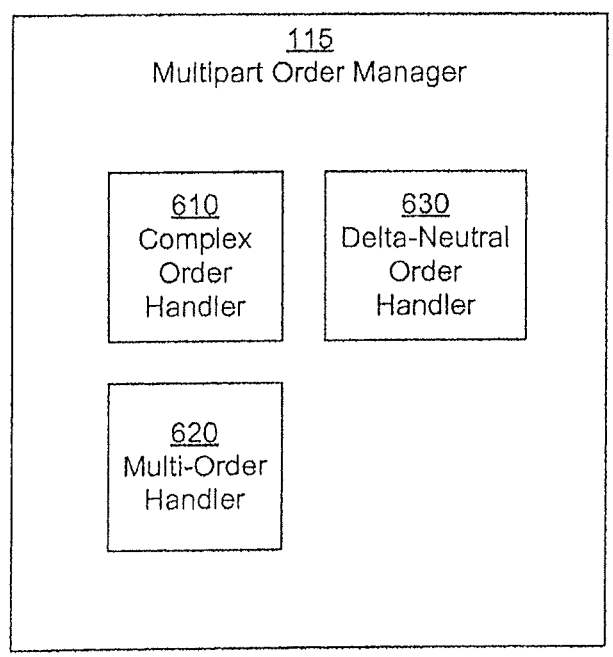
FIG. 6 illustrates a block diagram of an example multipart order manager for implementing a large liquidity-seeking ETS, consistent with one embodiment.

FIG. 6 illustrates a block diagram of an example multipart order manager 115 that may be configured for implementing a large liquidity-seeking ETS, consistent with one embodiment. The example multipart order manager 115 may include a complex order handler 610, a multi-order handler 620, and a delta-neutral order handler 630. The multipart order manager 115 may include additional modules, fewer modules, and/or alternate modules that provide similar, additional and/or alternative functionality.

Multipart orders may be classified based on the number of contracts in each order. The "leg ratio" of a multipart order may be considered the ratio between the number of contracts in the leg specifying the most contracts and the number of contracts in the leg specifying the fewest contracts.

The complex order handler 610 may handle complex multipart orders. In one embodiment, complex multipart orders may have a non-fractional leg ratio between 3:1 and 1:1 and concern a single financial instrument. The order book 111 may maintain a separate complex order book for complex multipart orders, so all trading may be executed may involve complex order against complex order. In one embodiment, the complex order handler 610 may handle complex multipart orders separately from single leg orders in the same financial instrument. The complex order handler 610 may monitor prices in the complex order book and compare them to display prices of comparable orders in the simple order book (i.e., orders having a single leg).

The complex order handler 610 may be configured to search for price locks or price crosses between comparable order books. The complex price locks or crosses with the display price when the best bid price of the complex order book equals or exceeds the display offer price of the simple order book, or when the best offer price of the complex order book equals or is less than the display bid price of the simple order book. Locked order books have matching prices on opposite sides of the display and BBO spread. Crossed order books have an inverted spread between the display and BBO prices on opposite sides. When the simple and complex order books are crossed or locked, the RFQ module 440 may initiate a price improvement auction for the simple order book and/or the complex order book.

In one embodiment, the complex order handler 610 may monitor the price of legs in a multipart order against the prices from the NBBO database 120. If the price of one or more of the legs of a multipart order crosses the opposite side NBBO price by more than a price crossing threshold, then the complex order handler 610 may block execution of the order as "too executable." The price crossing threshold may depend on the MPV of the financial instrument's price (e.g., 0.10 for an MPV of 0.01, 0.15 for an MPV of 0.05, 0.30 for an MPV of 0.10).

The multi-order handler 620 may handle multi-orders, which are multipart orders that do not meet the criteria of complex multipart orders. Multi-orders have fractional leg ratios, leg ratios greater than 3:1 (in this example), and/or specify multiple financial instruments. The order book 111 may maintain a separate book for multi-orders. In one embodiment, multi-orders may be submitted as SLOW orders. The BBO router 450 may route the legs of the multi-part order to receive away BBO prices better than prices at the ETS 105, and then the RFQ module 440 may initiate price improvement auctions for the remaining quantities of the legs of a received multi-order. Handling of multi-orders may support FOK or IOC execution instructions.

The delta-neutral order handler 630 may handle delta-neutral orders. In the context of financial instruments such as options, the delta of the option may indicate the price change of the option relative to a price change in an underlying financial instrument. A multipart order may be constructed from put options, call options, and/or a short or long position in the options' underlying financial instrument. When the total value of the multipart order, given the quantities and the prices of the legs, is substantially independent of changes in price of the underlying financial instrument, then the multipart order is delta neutral. More generally, delta-neutral multipart orders may include one or more legs involving a derivative whose value is quantifiably dependent on an underlying financial asset. In one embodiment, the order book 111 may maintain a separate delta-neutral order book for multipart orders that are delta neutral. The multipart orders in the delta-neutral book may not be fully delta neutral because the delta of a component leg may change as time elapses or as the price of the underlying financial instrument changes. Delta-neutral multipart orders may be based on multiple financial instruments whose prices are directly or statistically linked.

Exemplary Display Price Determination

Figure 7:
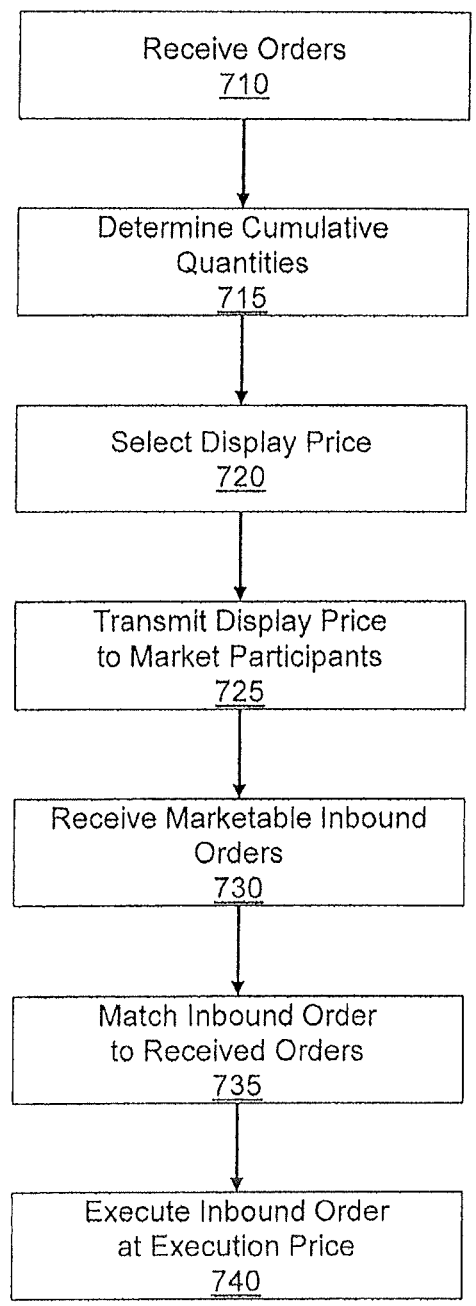
FIG. 7 illustrates an example flow chart for determining a display price and executing inbound orders, consistent with one embodiment.

FIG. 7 illustrates an example flow chart for determining a display price and executing inbound orders, consistent with one embodiment. Alternate embodiments may omit steps and/or may include alternative or additional steps. In this exemplary embodiment, the ETS 105 receives 710 orders that specify a financial instrument, a quantity, a side (e.g., buy or sell), and a limit price. The ETS 105 stores received orders in the order book 111 based on the received order's financial instrument.

The display price module 410 determines 715 cumulative quantities available on a side at a variety of prices. The cumulative quantity available for a side may depend at least in part on the quantity and the limit price of the received orders. The display price module 410 then selects 720 a display price for a side (e.g., a display bid price for the buy side and a display offer side for the sell side). In one embodiment, one or more eligible prices may be determined for a side based on the cumulative quantity available at the one or more eligible prices being greater than or equal to a display quantity threshold. The display price module 410 may then select 720 the display price for a side from the lowest eligible price for the display offer and the highest eligible price for the display bid. The reporting manager 114 may then transmits the display price for the side to market participants 725.

Next, the ETS receives a marketable inbound 730 order having an inbound side, an inbound price, and an inbound quantity. The inbound order may have an inbound price that is marketable against the display price of orders having the opposite side of the inbound side. If the received inbound order is a market order, then the inbound price may be the same as the display price on the opposite side, in one embodiment. Alternately or additionally, the inbound order may have an inbound price that is marketable against at least one order on the opposite side based on the limit price of the other order.

The order manager 112 then matches 735 the inbound order to one or more received orders having an opposite side from the inbound side. The matching may be based at least in part on the prices of the received orders and the inbound price, as well as the inbound quantity and the quantities of the received orders. In one embodiment, the inbound order is matched against the received orders having aggressive limit prices.

The ETS 105 may then execute the inbound order 740 and at least a portion of the one or more orders matched 735 to the inbound order. The execution occurs at an execution price that may be based at least in part on the inbound price, the inbound quantity, the quantity and/or the price of the one or more orders. In one embodiment, the execution price may be the display price and/or the inbound order price. Alternately or additionally, the execution price may be determined from the best price for the inbound order that enables matching with orders to fulfill the inbound order quantity.

Exemplary Inbound Fast Order Execution

FIG. 8A illustrates an example flow chart for executing orders with a FAST execution instruction, consistent with one embodiment. Alternate embodiments may omit steps or may include alternative or additional steps. In this exemplary embodiment, the ETS 105 receives a plurality of orders specifying at least a financial instrument, a quantity, a side, and a limit price. The display price module 410 then determines a display price based at least in part on the quantity and the limit prices of at least one of the plurality of orders. The ETS 105 then receives 810 an inbound order specifying the same financial instrument as the received plurality of orders, an inbound quantity, an inbound side, an inbound limit price, and an execution instruction. The inbound side is opposite from the side of the received plurality of orders.

If the execution instruction of the inbound order specifies FAST execution, then the FAST order module 420 handles the inbound order. In one embodiment, the FAST order module 420 compares 815 the inbound quantity to an order quantity threshold. The FAST order module 420 then determines 820 an execution price for one or more trades against the inbound order. If the inbound quantity is greater than the order quantity threshold, then the FAST order module 420 may determine 820 the execution price based at least in part on limit prices and quantities of the received plurality of orders, the inbound limit price, and/or the inbound quantity. The execution price, in one embodiment, may be the best price for the inbound order at which the inbound quantity is available, subject to the inbound limit price. If the inbound quantity is less than the order quantity threshold, the FAST order module 420 may determine 820 the execution price based at least in part on the determined display price. If the inbound quantity is less than the order quantity threshold and the inbound limit price is not marketable against the display price, then the inbound order may not execute until it becomes marketable against the display price.

The FAST order module 420 then matches 825 one or more orders from the plurality of orders to the inbound order based on at least in part on limit prices of the received plurality of orders. In one embodiment, the orders may be matched based at least in part on price priority and then on a pro-rata basis. The FAST order module 420 then executes 830 one or more trades at the execution price between the one or more matched orders and the inbound order.

Exemplary Inbound Slow Order Execution

FIG. 8B illustrates an example flow chart for executing orders with a SLOW execution instruction, consistent with one embodiment. Alternate embodiments may omit steps or may include alternative or additional steps. The ETS 105 may receive a plurality of orders specifying at least a financial instrument, a quantity, a side, and a limit price. The display price module 410 may then determine a display price based at least in part on the quantity and the limit prices of at least one of the plurality of orders. The ETS 105 receives 850 an inbound order specifying the same financial instrument as the received plurality of orders, an inbound quantity, an inbound side, an inbound limit price, and an execution instruction. The inbound side is opposite from the side of the received plurality of orders.

If the execution instruction specifies SLOW execution, then the SLOW order module 430 may oversee handling of the inbound order. The SLOW order module 430 may instruct the RFQ module 440 to conduct 855 a price improvement auction. The reporting manager 114 may communicate the inbound price and inbound quantity to market participants. The price improvement auction may include one or more rounds lasting a random duration of time, a predetermined time, or a duration of time determined by any desired means. The duration of time may be selected or determined, and may comprise a duration of time between a minimum duration and a maximum duration. The ETS 105 receives 860 auction orders specifying an auction order limit price and an auction order quantity.

The SLOW order module 430 may then execute 865 one or more trades between the inbound order and the one or more auction orders based at least in part on auction order limit prices, the inbound limit price, and/or the determined display price. In one embodiment, the inbound order may trade by price priority against the auction orders, subject to the inbound limit price and the display price. The one or more trades may occur at one or more auction order limit prices that provide a better price, for the inbound order, than the display price. In one embodiment, the auction order limit prices may be worse for the inbound order than the display price, and no trades may be executed between the inbound order and the one or more auction orders. In one embodiment, if an auction order limit price equals the display price, then the SLOW order module 430 may allocate a quantity to the corresponding auction limit order on a pro-rata basis.

If the inbound order has an unfilled quantity after executing one or more trades, then SLOW order module 430 may seek additional trades for the inbound order. To do this, the SLOW order module 430 may compare 870 the unfilled quantity to an order quantity threshold and determine 875 an execution price based on the comparison. If the unfilled quantity is greater than or equal to the order quantity threshold, then the SLOW order module 430 may determine 875 an execution price for one or more trades based on limit prices of the received plurality of orders and the inbound limit price. The execution price, in one embodiment, may be the best price for the inbound order at which the inbound quantity is available, subject to the inbound limit price. If the unfilled quantity is less than the order quantity threshold, then the SLOW order module 430 may determine 875 an execution price based at least in part on the determined display price. If the inbound quantity is less than the order quantity threshold and the inbound limit price is not marketable against the display price, then the inbound order may not execute until it becomes marketable against the display price.

The SLOW order module 430 then matches 880 one or more orders from the plurality of orders to the inbound order based at least in part on limit prices of the received plurality of orders. In one embodiment, the orders may be matched based at least in part on price priority and then on a pro-rata basis. The SLOW order module 430 then executes 885 one or more trades at the execution price between the one or more matched orders and the inbound order.

Some portions of above description describe the embodiments in terms of algorithms and symbolic representations of operations on information. These operations, while described functionally, computationally, or logically, should be understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein, any reference to "one embodiment" or "an embodiment" means that a particular element, feature, structure or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a large-liquidity seeking trading environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. An electronic trading system for executing trades, comprising:
one or more specialized computers, in communication with one or more external exchanges via one or more networks, comprising computer-readable instructions stored on a non-transitory computer-readable storage medium and executed by at least one processor, said computer-readable instructions, when executed, causing the one or more computers to:
receive, at the electronic trading system, a plurality of orders, each order specifying at least a financial instrument, a quantity, a side, and a limit price;
determine, from the received plurality of orders, a display price for the side based at least in part on the quantity and the limit price of at least one of the plurality of orders;
receive, by an order manager module of the electronic trading system, an inbound order specifying at least the financial instrument, an inbound quantity, an inbound side, an inbound limit price, and an execution instruction specifying at least one of a plurality of order handling routines, a first routine of the plurality of order handling routines automatically executing the inbound order at a price according to an order quantity, a second routine of the plurality of order handling routines comprising a price improvement auction, the inbound side opposite from the side of the received plurality of orders;
activate, by the order manager module, a request for quotation (RFQ) module responsive to the execution instruction specifying the second routine of the plurality of order handling routines, the RFQ module comprising programming instructions stored in a memory and executed by at least one processor, said programming instructions, when executed, cause the RFQ module to implement the second routine to:
initiate a timer, said timer defining an auction duration that is between a minimum duration and a maximum duration;
conduct the price improvement auction comprising one or more rounds, each round of the price improvement auction lasting a duration of time that is equal to said auction duration as defined by said timer; and
monitor, over the one or more networks, one or more external exchanges;
receive, at the electronic trading system, one or more auction orders responsive to the price improvement auction, each of the one or more auction orders specifying an auction order limit price and an auction order quantity; and
execute, by the order manager, one or more trades between the inbound order and the one or more auction orders based on the auction order limit prices, the inbound limit price and the determined display price.

2. The electronic trading system of claim 1, further comprising computer-readable instructions that, when executed, cause the one or more computers to:

notify one or more market participants of the financial instrument, the inbound side, the inbound limit price, and the inbound quantity.

3. The electronic trading system of claim 2, wherein the electronic trading system conducts the price improvement auction by executing computer-readable instructions that cause the one or more computers to:
   determine the duration of time through a random process or a pseudo-random process, the auction duration being greater than or equal to the minimum duration and less than or equal to the maximum duration;
   determine that the auction has ended based on the timer being greater than or equal to the auction duration; and
   notify the one or more market participants that the auction has ended.

4. The electronic trading system of claim 1, further comprising computer-readable instructions that, when executed, cause the one or more computers to repeatedly conduct the price improvement auction, receive one or more auction orders, and execute one or more trades until at least one the following conditions is met: a total auction time exceeds a total time threshold, a total auction round counter exceeds an auction round threshold, and the one or more trades fulfill the inbound quantity.

5. The electronic trading system of claim 1, further comprising computer-readable instructions that, when executed, cause the one or more computers to:
   execute one or more trades at the determined display price, the one or more trades involving the inbound order and the received plurality of orders.

6. The electronic trading system of claim 1, wherein the electronic trading system executes the one or more trades between the inbound order and the one or more auction orders by executing computer-readable instructions that cause the one or more computers to:
   rank the received one or more auction orders based on the auction order limit price of each of the one or more auction orders, wherein auction orders having better auction order limit prices are ranked higher; and
   select at least one auction order for execution, the selected at least one auction order having a total quantity greater than or equal to the inbound quantity.

7. The electronic trading system of claim 6, further comprising computer-readable instructions that, when executed, cause the one or more computers to:
   execute a partial quantity of at least one auction order having an equal ranking among the selected one or more orders, the partial quantity determined being proportional to the auction order quantity of the at least one auction order.

8. The electronic trading system of claim 6, wherein the better auction order limit prices comprise higher prices if the inbound order has a sell side and lower prices if the inbound order has a buy side.

9. The electronic trading system of claim 1, wherein the inbound order comprises an additional execution instruction, the electronic trading system further comprising computer-readable instructions that, when executed, cause the one or more computers to:
   cancel at least a portion of the inbound order based on the additional execution instruction, the portion of the inbound order comprising an unfilled quantity remaining after execution of the one or more trades.

10. The electronic trading system of claim 1, wherein the computer-readable instructions to monitor one or more external exchanges, comprises computer-readable instructions that, when executed, cause the one or more computers to:
    monitor one or more away best bid-offer (BBO) prices at the one or more external exchanges;
    determine that an away BBO price is better for the inbound order at least one external exchange of the one or more external exchanges; and
    route at least a portion of the order to the at least one external exchange.

11. The electronic trading system of claim 10 further comprising computer-readable instructions that, when executed, cause the one or more computers to:
    select the at least one external exchange based at least in part on the additional execution instruction.

12. The electronic trading system of claim 1, wherein the inbound order comprises an unfilled quantity after execution of the one or more trades, the electronic trading system further comprising computer-readable instructions that, when executed, cause the one or more computers to:
    compare the unfilled quantity of the inbound order to an order quantity threshold;
    determine an execution price for one or more additional trades based on limit prices of the received plurality of orders and the inbound limit price if the unfilled quantity is greater than or equal to the order quantity threshold, or based on the determined display price if the unfilled quantity is less than the order quantity threshold;
    match one or more orders from the plurality of orders to the inbound order, the match based, at least in part, on limit prices of the received plurality of orders; and
    execute one or more additional trades between the inbound order and the one or more matched orders, the one or more additional trades being executed at the execution price.

* * * * *